United States Patent [19]
Smith et al.

[11] Patent Number: 5,428,759
[45] Date of Patent: Jun. 27, 1995

[54] ASSOCIATIVE MEMORY SYSTEM HAVING SEGMENT AND PAGE DESCRIPTOR CONTENT-ADDRESSABLE MEMORIES

[75] Inventors: Christopher E. Smith, El Toro; Howard J. Keller, Carlsbad; Robert L. Noble, Lake Elsinore, all of Calif.

[73] Assignee: Unisys Corporation, Blue Bell, Pa.

[21] Appl. No.: 324,864

[22] Filed: Oct. 18, 1994

Related U.S. Application Data

[63] Continuation of Ser. No. 860,527, Mar. 30, 1992, abandoned.

[51] Int. Cl.[6] ........................ G06F 12/08; G06F 12/10
[52] U.S. Cl. ..................................... 395/400; 395/425; 364/DIG. 1
[58] Field of Search ................. 395/400, 425

[56] References Cited

U.S. PATENT DOCUMENTS

| | | | |
|---|---|---|---|
| 4,096,568 | 6/1978 | Bennett et al. | 395/400 |
| 4,638,426 | 1/1987 | Chang et al. | 395/400 |
| 4,669,043 | 5/1987 | Kaplinsky | 395/425 |
| 4,680,700 | 7/1987 | Hester et al. | 395/400 |
| 4,763,250 | 8/1988 | Keshlear et al. | 395/400 |
| 4,785,398 | 11/1988 | Joyce et al. | 395/400 |
| 4,972,338 | 11/1990 | Crawford et al. | 395/400 |
| 4,980,816 | 12/1990 | Fukuzawa et al. | 395/400 |
| 5,053,951 | 10/1991 | Nusinov et al. | 395/425 |

*Primary Examiner*—Jack B. Harvey
*Assistant Examiner*—Michael A. Whitfield
*Attorney, Agent, or Firm*—Alfred W. Kozak; Mark T. Starr; Stanton D. Weinstein

[57] ABSTRACT

An associative memory system for logical addressing of memory segments using paged memory. The physical address of a targeted data word can be generated in one machine cycle if the segment logical base address and page index of the targeted word resides in an associated set of CAMs and RAMs. If the targeted word's logical base address and page index is not in the set of associated CAMs and RAMs, this information can be acquired at the most optimum rate for enabling data access. This rate may require several clock cycles.

7 Claims, 10 Drawing Sheets

FIG. 2

| PHYSICAL ADDRESS | ASD NUMBER | PAGE INDEX |
|---|---|---|
| 5019 | 17 | 19 |
| ⋮ | ⋮ | ⋮ |
| 5006 | 30 | 6 |
| 5005 | 25 | 5 |
| 5004 | 40 | 4 |
| 5003 | 120 | 3 |
| 5002 | 90 | 2 |
| 5001 | 60 | 1 |
| 5000 | 20 | 0 |

FIG. 3

| PHYSICAL ADDRESS | | |
|---|---|---|
| ⋮ | ⋮ | ASD WORDS FOR SEGMENT 1 |
| 5 | | |
| 4 | BASE ADDRESS OF SEGMENT 1 | |
| 3 | | |
| 2 | | ASD WORDS FOR SEGMENT 0 |
| 1 | | |
| 0 | BASE ADDRESS OF SEGMENT 0 | |

ASSOCIATIVE MEMORY SYSTEM HAVING SEGMENT AND PAGE DESCRIPTOR CONTENT-ADDRESSABLE MEMORIES

This continuation of application Ser. No. 07/860,527 filed on March 30, 1992, now abandoned.

FIELD OF THE INVENTION

This disclosure relates to a highly efficient system for address translation for use in a computer processor and is specifically designed to expedite the accessing of data within a paged region of memory.

CROSS REFERENCES TO RELATED APPLICATIONS

This application is related to the following copending applications which are included herein by reference:

U.S. Ser. No. 07/781,551, filed Oct. 22, 1991, entitled "System for Pointer Updating Across Paged Memory";

"Cache Coherency System with Dual Ported CAMs", filed on Feb. 22, 1991 as U.S. Ser. No. 660,455, U.S. Pat. No. 5,283,882.

"Dual Ported Content Addressable Memory Cell and Array", filed Nov. 19, 1990 as U.S. Ser. No. 615,941, U.S. Pat. No. 5,226,005.

"Extended Address Translation System for Pointer Updating in Paged Memory Systems", filed Jun. 13, 1991 as U.S. Ser. No. 714,480.

BACKGROUND OF THE INVENTION

A pointer is a logical address in a program used to locate a particular data word within some region of memory. They are commonly used in many programming languages and allow powerful and elegant programs to be written. They can cause reductions in program execution speed because of the processing overhead. Because of the frequency with which pointer operations occur in program execution, it is critical to a processor's performance to handle them efficiently.

The program itself, plus any data which may be required during its execution by the processor, is stored in main memory. These regions of memory, or 'segments', may be contiguous (an 'actual segment') or divided into a number of 'pages' for easier memory management (a 'virtual segment'). A page is an actual segment of fixed size. Virtual or 'paged' segments allow efficient use of the processor's memory resources, but again they can introduce a substantial overhead to maintain.

The presently described system involves an associative memory using ASDs or Actual Segment Descriptors which are sets of 4 words used to describe an actual segment of memory.

The system of virtual memory in which this ASDAM (Actual Segment Description Associative Memory) system occurs, is referred to as the ASD (Actual Segment Descriptor) system. It allows any individual word location in main memory to be referenced by identifying the region of contiguous memory wherein the word lies, plus the displacement of the word from the base of that region. The 'ASD number' is the means of identifying a region of contiguous memory, when using the ASD system. Every region of contiguous memory has a unique ASD number, assigned by the operating system. The correspondence between the ASD number and the physical location of the region is provided by a table in main memory called the ASD table. An ASD number is 23 binary bits in length, limited by the amount of room in the pointers that have to contain them, while the displacement is 20 bits in length.

The purpose of the ASD system is to allow logical addressing, whereby programs referencing data can be written and compiled without knowledge of the physical address of the data in main memory. It is kept track of by the operating system. The ASD system of memory management allows data to be referenced throughout a region of memory much larger than that addressable using a 23 bit base address plus 20 bit displacement. This is done by using the ASD table to map the ASD number to a 32 bit base address.

The main memory is comprised of 48-bit words and these are grouped into actual segments, or contiguous regions. Each of these is given an ASD number. The ASD table stores, for each ASD number, the physical address of the beginning or 'base' of the actual segment and various other information about the segment. The length of a page is 4096 data words in this system. A page table is an actual segment of memory which contains the ASD numbers of the various pages which comprise a given paged segment. The ASD number of the first page is at the first location, the second at the second location, etc. Every virtual segment has its own page table and it resides in memory. An example of a page table is shown in FIG. 2.

The ASD table stores information for every actual segment currently in use by the processor. It resides at a fixed location in main memory. The word containing the base address of a segment is referred to as the "ASD1" word. The ASD1 word of ASD number 0 is stored at memory address 0. For ASD number 1, it is stored at address 4, and so on for all ASD numbers. It may be seen that to translate an ASD number into the address of its ASD1 word, it is necessary to multiply the ASD number by 4. The ASD table is shown in FIG. 3.

A "pointer" may be considered to consist of three parts: An ASD number, a page index and a word index. The ASD number identifies a region of memory which may be paged or unpaged. The page index identifies, for a paged segment, which page is to be accessed. The word index indicates which word within the selected page contains the target data. In an unpaged pointer, i.e., a pointer which points to an unpaged segment, the ASD number is that of the segment containing the data. In a paged pointer, i.e., one that points to a paged segment, the ASD number is that of the virtual segment's page table.

The pointer is a "logical address" and before it can be used to access memory, it must be translated into a "physical address". This is done by identifying the base address of the actual segment containing the target data and adding to it the displacement given by the word index. Once this is done, the physical address is sent to main memory with a memory command requesting a read operation. This is referred to as a 'Load'.

Here, the word "Load" refers to the placing of a data word (retrieved from memory) into the processor's register for purposes of executing a program.

A Content Addressable Memory (CAM) is a memory structure whose function is to indicate which of its internal data locations contains a data word presented to it as a 'searchkey'. A data word is initially written into the CAM at a location indicated by an address input and thereafter, if the exact same data appears on the searchkey input, an indication of a match, called a 'hit flag' is asserted and the 'location number' of the data location containing the searchkey data is also provided as an output. The location number output of a CAM may be used as an address input to a RAM. The RAM then provides as an output, the data residing at the location corresponding to the location number of the original match in the CAM.

Without the use of the ASDAM system, "Loads" are achieved by a combination of hardware and microcode. The accessing of virtual segments can be a slow process and is "conventionally" achieved as follows:

The ASD number of the page table from the pointer is translated into the address of its ASD1 word, containing the base address of the virtual segment's page table. This is fetched from memory. The base address is added to the page index to form the address of the location in the page table which contains the ASD number of the particular page in which the required data resides. The ASD number at this address is then fetched from memory. This ASD number, when it returns, is translated into the address of its ASD1 word and a third memory request is issued to fetch this. The ASD1 word contains the base address of the page and the word index, (being the displacement from the base of the page) is added onto it. This finally is the address of the target word required. A fourth memory request is issued to fetch it. This process takes many machine cycles plus 4 serial memory accesses.

The ASDAM system described herein performs rapidly the otherwise tedious tasks of translating the logical address contained to reference main memory. In the best case, this entire operation may be achieved by the ASDAM in a single clock cycle.

The address translation is performed, when all data is present, by presenting the logical address (in pointer) to the ASDAM 8 (FIG. 1). Thus one CAM search and one RAM lookup provides the physical address in one machine cycle as later discussed in "case situation 1".

SUMMARY OF THE INVENTION

When the instruction currently being executed by the processor 4 in FIG. 1 indicates that a Load operation needs to be performed, the ASD number, the page index and the word index are provided to the ASDAM system 8. The ASD number is applied as a searchkey to both Segment ASD CAM (20) and the Page Table ASD CAM 30 and the respective hit flags indicate whether this ASD number is present. Simultaneously, the page index is applied to the Segment PI (Page Index) CAM 10 and the Page Index CAM 40. Again, the hit flags indicate whether this page index is present. The ASDAM system is shown in FIG. 1 where processor 4 activates the CAMs 20, 10 and 30, 40.

The Control Logic 100 monitors which of the CAMs scored hits in their searches. Based on this information, it is able to determine whether the particular information required for the Load is present in the ASDAM 8. Memory requests are initiated to fetch any missing data. The searchkey data which scored the CAM miss and caused the memory fetch, is stored in a location of that CAM. When the data returns, it is stored in the corresponding location of the RAM and thus when the same search is repeated, a hit is found. When all the data required is present, the physical address of the target data is formed and sent to main memory 90 along with a memory command on line 89, requesting the data.

A "Load" of a paged pointer, as previously described, may be accomplished in a single machine cycle if all data is present in the ASDAM RAMs 50, 60. The following case situations may occur:

1. When the searches are performed, the Control Logic 100 finds a hit at the same location number of both the Segment PI CAM 10 and the Segment ASD CAM 20. If this is the case, then the corresponding location of the Address RAM 50 contains the base address of the page corresponding to the page table ASD number and page index being supplied by the processor 4. This identifies the page within which the required data word lies. The base address is read from the RAM 50 and added onto the word index from line 48, FIG. 1, by the Memory Request Logic 80, to form the physical address of the target data word. This is then sent to memory 90 with a read request command. This operation is performed in a single machine cycle. The target data is subsequently returned by the memory 90 to the processor 4.

2. If hits as described above are not found, the Control Logic 100 checks for hits on the same location number of both the Page Table ASD CAM 30 and the Page Index CAM 40. If both are found, then the data in the corresponding location of the ASD RAM 60 is the ASD number of the "destination page", i.e., the page containing the target data. This is translated by the Memory Request Logic 80 into the address of the page's ASD1 word which is fetched to provide the base address of the page. The ASD number and the page index are stored in the Segment ASD CAM 20 and Segment PI CAM 10 respectively and the base address is stored on its return in the corresponding location of the Address RAM (50). The "Load" is then restarted and this time the Segment ASD CAM 20 and the Segment PI CAM 10 both yield hits and the operation is completed as in case 1.

3. If hits as described in cases 1 or 2 above are not found, the Control Logic 100 next checks for any hit found in the Segment ASD CAM 20 at a location where there is not a valid hit in the Segment PI CAM 10. If this is found, then the corresponding location in the Address RAM (50) contains the physical address of the base of the page table 90P (FIG. 1) of this virtual segment. In this case, the page index on line 41 (FIG. 1) is added by the Memory Request Logic (MRL) 80 to the page table base to form the address of the location in the page table which contains the ASD number of the destination page. A read request to memory is issued to fetch this data, which is stored on its return in the ASD RAM (60) while its corresponding page table ASD number and page index are stored in the corresponding location of the Page Table ASD CAM 30 and Page Index CAM 40 respectively. The Load is then restarted and this time the Page Table ASD CAM 30 and the Page Index CAM 40 both yield hits and the operation is completed as in case 2.

4. If there are no hits found, as described above, then the base address of the page table 90P must be fetched from memory 90. The ASD number supplied by the processor 4 is translated by the Memory Request Logic 80 into the physical address of its ASD1 word, containing the address of the base of the page table 90P. A memory read is initiated to return this ASD1 word and it is stored in a location in the Address RAM 50. The page table ASD number is stored in the Segment ASD CAM (20) at the corresponding location. Thus when the Load is restarted, the Segment ASD CAM (20) shows a hit while the hits flags from the other CAMs remain unchanged. Now operation continues as described in case 3.

Typically programs during execution reference a small number of data segments many times and each page of a virtual segment is accessed many times. The Loading of pointers therefore requires the same ASD numbers and ASD1 words to be fetched from memory many times. The ASDAM system is a small cache, located within the processor, for providing these ASD numbers. Hit rates of over 90% are regularly achieved, having a significant effect on overall processor performance. Special purpose hardware is also provided in the Memory Request Logic 80 to form memory addresses to reference missing data. This allows the data to be requested in the same machine cycle that it is detected to be missing. This saves the machines cycles and microcode that would be required to perform the same functions using the general purpose processing hardware.

Thus the ASDAM 8 of FIG. 1 is a hardware system for referencing memory data via logical addresses. Short microcode routines are dynamically invoked to fill the CAMs and RAMs when missing data is detected. This allows the primary microcode to be optimized with the assumption that all data will be present locally in the processor and the "Load " will occur in a single machine cycle. The hardware takes all necessary action to detect "misses" and fetch missing data and restart the operation. Another strength of the ASDAM system is that, despite its high hit rate, it is able to anticipate misses, by simultaneously performing searches and generating addresses to be used in the event that all data is not present. Thus if a miss is detected, the Control Logic 100 can dynamically initiate a fetch request to memory without wasting a single machine cycle. If the data is present, the Load operation is completed and the ASDAM's fetch request and its address are discarded.

The microcode is contained within VLSI silicon die local to or even integrated within the processor. Microcode memory space is therefore at a premium and savings achieved by using the ASDAM system increases performance by making space for additional optimizations in other routines, as well as the direct savings in updating pointers.

BRIEF DESCRIPTION OF THE DRAWINGS

FIG. 2 shows an example of a page table for a virtual segment;

FIG. 3 shows the structure of the ASD table in main memory;

GLOSSARY

Figure 1:
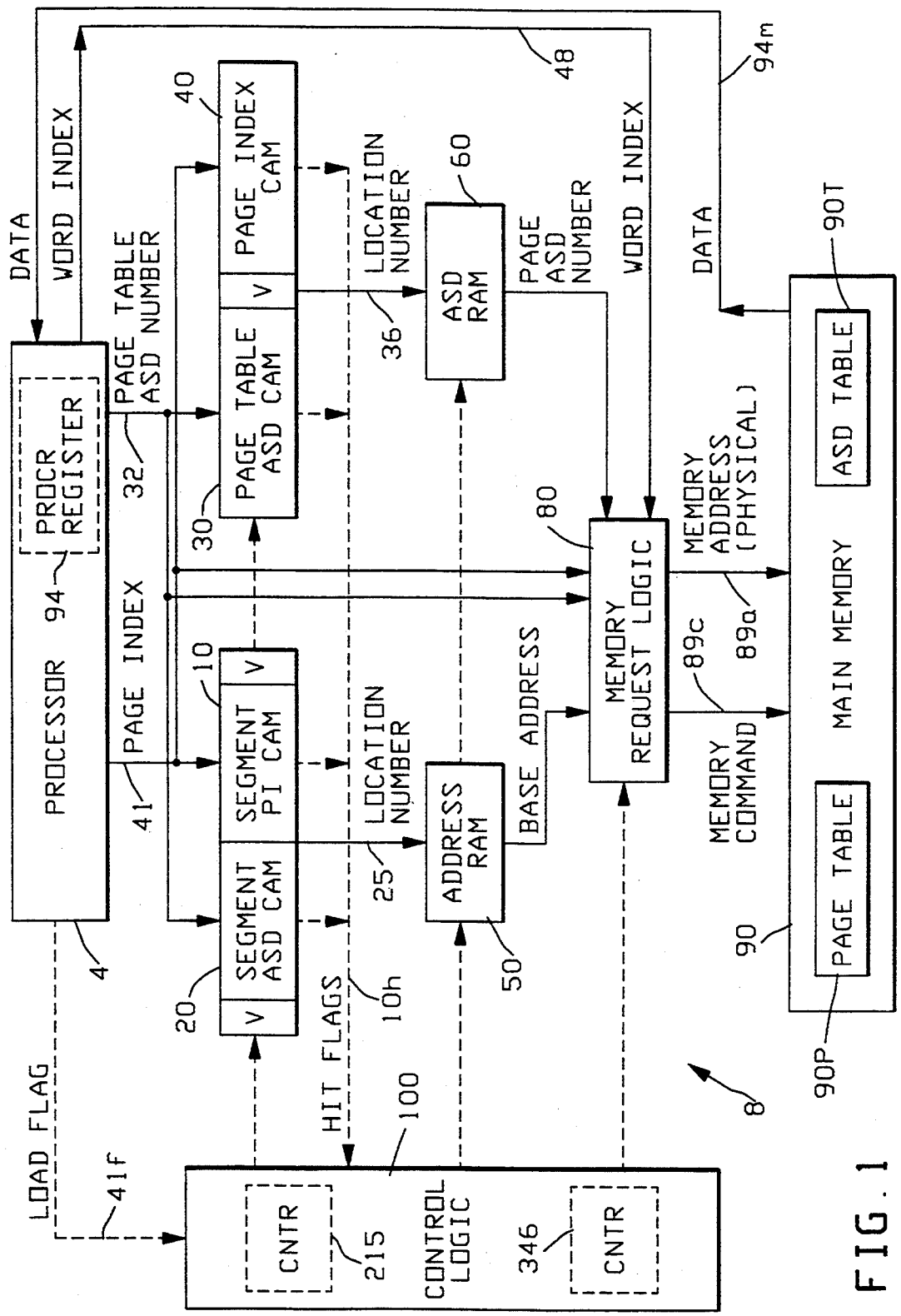
FIG. 1 is a block diagram of the overall structure of the ASDAM (Actual Segment Descriptor Associated Memory) system.
Figure 4:
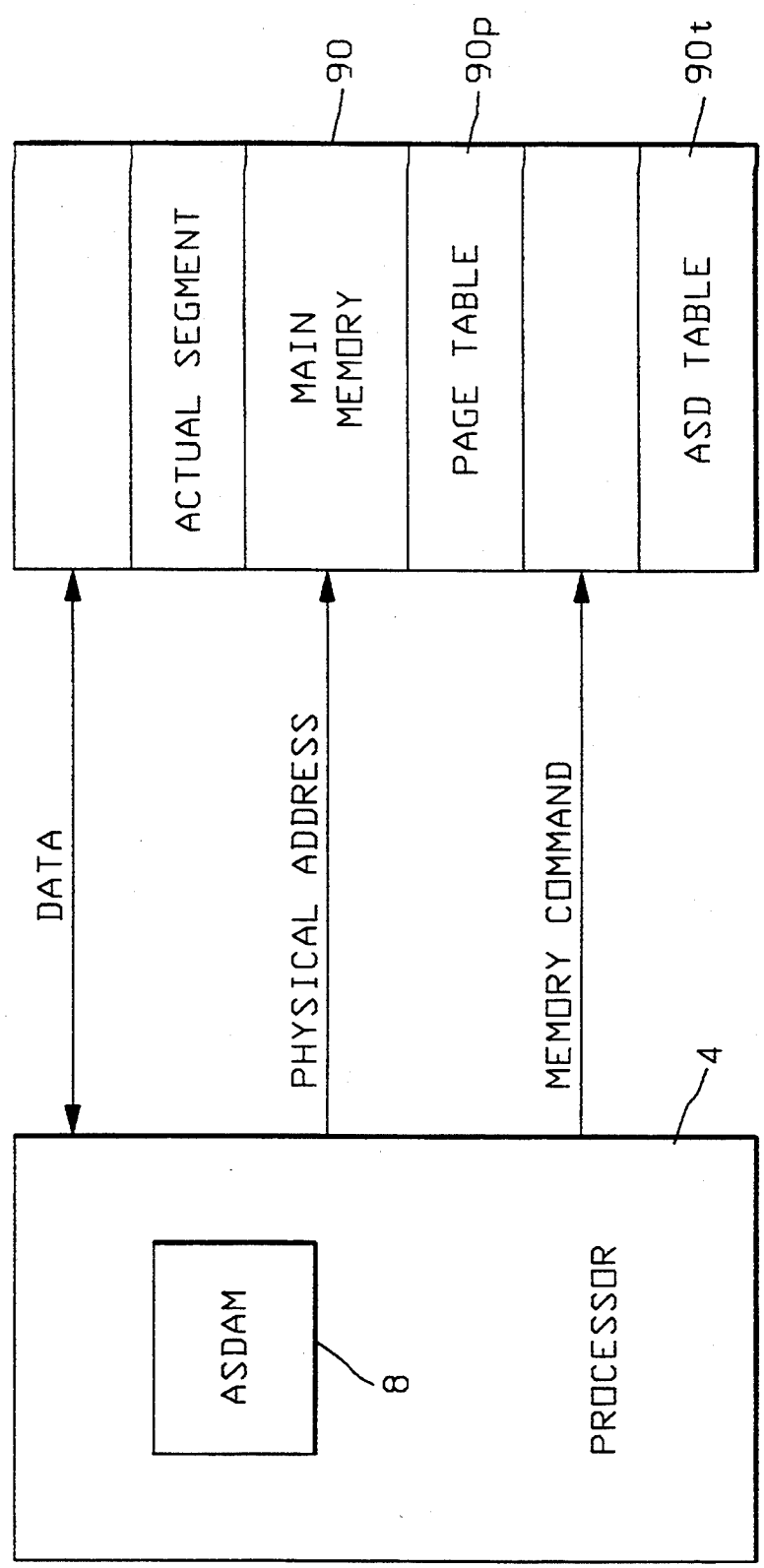
FIG. 4 shows the ASDAM located within the processor and the relationship to main memory.

ACTUAL SEGMENT: A contiguous region of main memory.

ACTUAL SEGMENT DESCRIPTOR (ASD): A set of 4 words used to describe an ACTUAL SEGMENT. The ASD contains the BASE address and the LENGTH of the segment. If it is one PAGE of a VIRTUAL SEGMENT, then it also contains its PAGE INDEX and the ASD NUMBER of the PAGE TABLE.

ASD NUMBER: A means for identifying a block of contiguous memory (segment). Every block of contiguous main memory has a unique ASD Number (assigned by the operating system). It is used to associate each block of memory with a set of 4 ASD words, describing its location and size.

ACTUAL SEGMENT DESCRIPTOR ASSOCIATIVE MEMORY (ASDAM): A local cache system for performing ADDRESS TRANSLATION in a computer system using the ASD system of main memory management.

ADDRESS RAM: One of the 2 RAMs used by the ASDAM system. This 32-bit wide by 16-word deep RAM contains the PHYSICAL ADDRESSES of PAGE TABLES and PAGES for use in ADDRESS TRANSLATION.

ADDRESS TRANSLATION: The process by which LOGICAL ADDRESSES are turned into PHYSICAL ADDRESSES.

ASD RAM: One of the 2 RAMs used by the ASDAM system, this 23-bit wide by 8-word deep RAM contains the ASD numbers of PAGES for use in address translation.

ASD TABLE: A table in main memory maintained by the computer operating system to associate ASD NUMBERS with their ASD words. It always begins at PHYSICAL ADDRESS 0.

ASD WORDS: A set of 4 words, associated with each ASD Number, which are stored in the ASD table. These words contain the PHYSICAL BASE ADDRESS of the ACTUAL SEGMENT, its length, the ASD NUMBER of the PAGE TABLE of the VIRTUAL SEGMENT, and the PAGE INDEX of the PAGE.

BASE: The PHYSICAL ADDRESS of the first word of an ACTUAL SEGMENT in main memory.

CAM (CONTENT ADDRESSABLE MEMORY): A memory structure which is used to compare a data item with the set of data items already stored within itself. A match results in a HIT FLAG and LOCATION NUMBER being provided.

CONTROL LOGIC: A part of the ASDAM system providing overall control to the memories and associated logic blocks. The control logic is responsible for interpreting the various requirements of the operator being executed and initiating the actions necessary for the ASDAM to complete it.

HIT FLAG: An output from a CAM indicating whether a match on the searchkey data has been found.

LENGTH: The number of data words in an ACTUAL SEGMENT in main memory.

LOCATION NUMBER: The identifier of a given CAM location. This is the output from a CAM indicating, when a match on the searchkey data has been found, which location contains the matching data.

LOGICAL ADDRESS: An identifier of a word in main memory, consisting of a WORD INDEX relative to the BASE of a PAGE and the ASD NUMBER indicating the SEGMENT containing that page. MEMORY ADDRESS: The physical address of a location in main memory.

MEMORY COMMAND: An instruction issued by the processor to main memory requesting either a read operation from the accompanying address or a write operation using the accompanying address and data.

MEMORY REQUEST LOGIC: A part of the ASDAM system which, upon direction from the CONTROL LOGIC, forms PHYSICAL ADDRESSES and issues MEMORY COMMANDS to the main memory.

PAGE: An ACTUAL SEGMENT of fixed size i.e. 4096 words in the system described.

PAGE INDEX: The identifying number of a particular PAGE within a VIRTUAL SEGMENT.

PAGE INDEX CAM: One of the 4 CAMs of the ASDAM system, this 12-bit wide by 8-word deep CAM is used to store the PAGE INDICES of PAGES whose ASD NUMBERS are stored in the ASD RAM.

PAGE TABLE: An ACTUAL SEGMENT associated with a VIRTUAL SEGMENT and containing the ASD NUMBERS of each of the PAGES of the segment.

PAGE TABLE ASD CAM: One of the 4 CAMs of the ASDAM system, this 23-bit wide by 8-word deep CAM is used to store the ASD NUMBERS of various PAGE TABLES for use by the ASDAM in address translation.

PAGED MEMORY: A method of organizing main memory such that data is divided into PAGES, i.e. SEGMENTS of fixed size, for easier management.

PAGED POINTER: A POINTER indicating a region of PAGED MEMORY.

PHYSICAL ADDRESS: The identifier of location in main memory expressed as the number of that location relative to the absolute base of main memory.

POINTER: A data structure used to locate a particular word within a SEGMENT of main memory.

RAM (RANDOM ACCESS MEMORY): A hardware memory structure within which data words may be stored and subsequently retrieved. New word data can be written to replace older data.

SEGMENT: A region of main memory. It may be contiguous or paged.

SEGMENT ASD CAM: One of the 4 CAMs of the ASDAM system, this 23-bit wide by 16-word deep CAM is used to store the ASD NUMBERS of various PAGE TABLES used in the ADDRESS TRANSLATION process.

SEGMENT PI CAM: One of the 4 CAMs of the ASDAM System this 12-bit wide by 16 word deep CAM is used to store the PAGE INDICES of PAGES whose BASE ADDRESSES are stored in the ADDRESS RAM.

UNPAGED POINTER: A POINTER which references a single contiguous region of main memory, rather than a VIRTUAL SEGMENT.

VIRTUAL SEGMENT: A region of main memory which is divided into a number of PAGES for easier management.

WORD INDEX: The number of the word referenced by an INDEXED POINTER relative to the base of the ACTUAL SEGMENT.

DESCRIPTION OF THE PREFERRED EMBODIMENT

Figure 5:
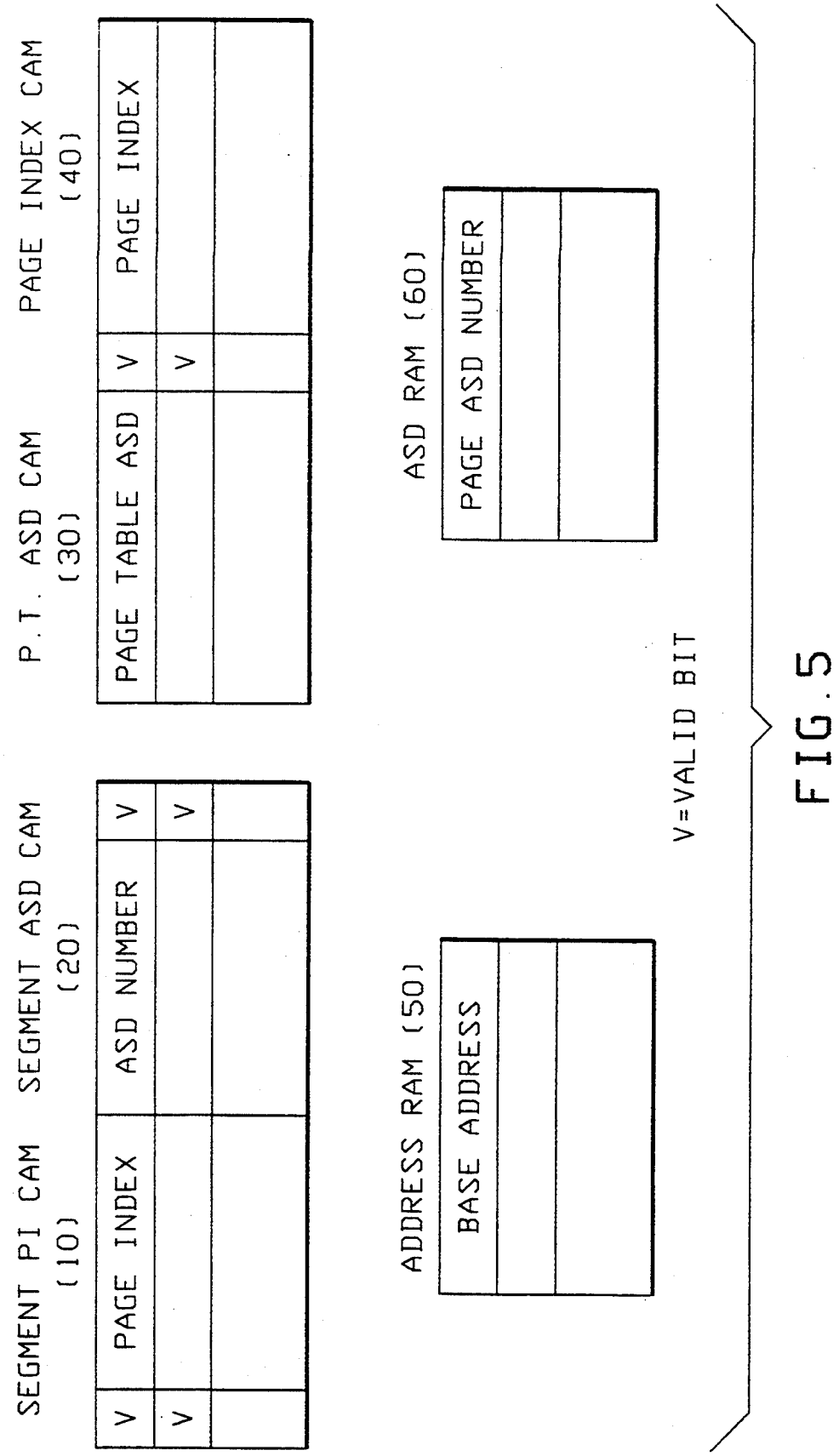
FIG. 5 shows the ASDAM CAMs, RAMs and valid bits.

The ASDAM system includes four CAMs and two RAMs, as shown in FIG. 1 and FIG. 5. It also has Control Logic 100 which monitors and directs all Loads required by the executing code and can interrupt processor execution to perform its own operations and to fetch and store data from memory into the ASDA memory structures. In addition, the ASDAM has Memory Request Logic 80 to form memory addresses and issue memory commands. The Control Logic 100 determines which address is required for the particular situation and selects it accordingly. The overall ASDAM system is shown in detail in FIG. 1.

The Segment ASD CAM 20 and the Segment PI CAM 10 are associated with the Address RAM 50 in that the location number of a hit found in these CAMs is used as an address to read from the RAM. Each CAM has a valid bit associated with each location to indicate whether the Address RAM 50 contains the correct data at the corresponding location. The Segment ASD CAM 20 is 23 bits wide, which is the width of an ASD number, and the Address RAM is 32 bits wide, the width of a physical address to main memory. The Segment PI CAM 10 is 12 bits wide, this being the maximum width of a page index. These CAMs and RAM are 16 locations deep. When the "valid bit" (V) for a particular location of the Segment ASD CAM is set, but the valid bit for the same location of the Segment PI CAM is not set, the Segment ASD CAM location contains the ASD number of a page table 90P and the Address RAM 50 contains the physical address in memory of the base of that page table. If the valid bit for a location of the Segment ASD CAM is set and the same location of the Segment PI CAM also has the valid bit set, then the Segment ASD CAM still contains the ASD number of a page table and the Segment PI CAM contains the page index of a particular page within that virtual segment. In this case, the Address RAM 50 contains the base address of the page identified by the ASD number and page index.

The Page Table ASD CAM 30 and the Page Index CAM 40 are associated with the ASD RAM 60 in that a hit found in the same location of both of these CAMs gives the location number used as a read address of the RAM. These two CAMs share a single valid bit for each location, indicating that the same locations in each CAM are always valid. A valid location in the Page Table ASD CAM 30 contains the ASD number of a page table. The same location in the Page Index CAM 40 contains a page index value. The ASD RAM 60 data in the corresponding location is the ASD number of the page at that page index of that page table.

The width of the Page Table ASD CAM 30 and ASD RAM 60 is 23 bits and the width of the Page Index CAM 40 is 12 bits. Each of these memories is 8 locations deep. The Segment PI CAM 10, Segment ASD CAM 20 and Address RAM 50 are deeper than the other memory structures because they have a greater requirement to store in-use data. Each of the 6 memory structures in the ASDAM is a custom designed cell in CMOS technology.

A CAM 'hit' is defined as an exact match of the searchkey with the data in one of the CAM locations whose valid bit is set. The Searchkeys are carried on lines 41 and 32 to each CAM, i.e., respectively to CAMs 10, 40 and CAMs 20, 30. A match on data whose valid bit is not set is of no value and is not reported. If there are "misses" in the ASDAM, data may have to be fetched from memory 90 using an address generated by the Memory Request Logic 80. Depending on the data required, this address may be of the ASD1 word of a given ASD number or of a page ASD number at some location in a page table 90P. The address of an ASD1 word is found by shifting the data left by 2 bits, i.e., multiplying by 4. It will be seen from the structure of the ASD table 90T (FIG. 3) in memory that this procedure translates any ASD number into the address in memory of its corresponding ASD1 word. The address of the location in memory containing the page ASD number of a given page is found by the addition of the page table base address and the page index of that page. Whether a memory request is generated and which address is used is governed by the Control Logic 100. Addresses are generated every machine cycle, so that if a memory request is required, the address and fetch command may be issued without delay. The outputs of this logic are the memory command requesting the fetch of a word of data and the physical address in memory of the data to be returned (FIG. 1).

The Control Logic 100 (FIG. 1) contains two counters, one (215) for the PI CAM 10, Segment ASD CAM 20 and Address RAM 50 and one (346) for the other 3 memory structures. These are used to supply write addresses to the CAMs and RAMs. Whenever a Write operation to the ASDAM 8 is complete, the relevant counter is incremented. The counter 215 supplying addresses to the 16 location structures 10, 20, 50 counts from 0 to 15, then returns to zero and begins again. The other counter 346, supplying addresses to the 8 location structures, (30, 40, 60) cycles from 0 to 7.

The depth of the memory structures has been chosen as an optimal compromise between processor performance, access speed and physical size. The larger the memories, the greater the probability of a hit on a given search, and so the fewer cycles are spent waiting for memory data. However, larger structures also take up critical area on the VLSI die and have slower access times. During normal processor operation, the slots are quickly filled and thereafter, when a new slot is required, a slot which already contains valid data must be overwritten. This is done with the address counters 215, 346 a described above, in a cyclic "round-robin" manner by which each slot is overwritten in turn. This simple replacement scheme has been shown by modelling to be as efficient for this application as more sophisticated algorithms.

It will be seen that the CAMs and RAMs of the ASDAM system exist to provide the base address of the destination page without accessing main memory. This is then added onto the word index and the resulting address is sent to memory along with a read request command. When the data returns, it is stored back into a processor register, 94.

FUNCTIONAL OPERATION:

When a Load requirement is encountered, the ASD number, word index and page index are presented (FIG. 1) to the ASDAM 8 by the processor 4. The page index is passed to the Segment PI CAM 10 and Page Index CAM 40. The ASD number is passed to the Segment ASD CAM 20 and the Page Table ASD CAM 30. A search of all 4 CAMs takes place simultaneously using these searchkeys. Locations whose valid bits are set and whose contents match the searchkey exactly cause the hit hit flags on lines 10h to be asserted and the location number of the hit is provided via lines 25 and 36 at the output. The hit flags from all 4 CAMs are provided to the Control Logic 100.

The Control Logic 100 must first determine whether the processor is attempting to perform a Load operation on a paged pointer. A 'Load' flag on line 41f (FIG. 1) is received from the processor 4 for this purpose. When this flag is set, the Control Logic 100 controls the operation of the ASDAM and fetches and writes into the ASDAM any missing data. If it is not set, the ASDAM takes no action.

The page index and the ASD number of the page table 90P between them uniquely identify the destination page. A hit in the Segment ASD CAM 20 indicates that the page table ASD number is present in a valid location of this CAM. In fact, if several pages of the same segment have been already accessed, there may be several valid locations in the CAM, each containing this same page table ASD number, but each with a different page index in the corresponding location of the Segment PI CAM 10.

A hit on the same location in both the Segment PI CAM 10 and the Segment ASD CAM 20 indicates that the base address of the page corresponding to the page index and page table ASD number is present in the Address RAM 50 at the location given by the location of the hit. The location number of the CAM hits is presented to the Address RAM 50 which in turn supplies the base address of the destination page in main memory.

A hit in the Segment ASD CAM 20 but not in the Segment PI CAM 10 indicates that the Address RAM 50 contains, at the corresponding location, the base of the page table. If there are not dual hits as described above, then the single hit location is sent to the Address RAM 50 which supplies the page table base address. The output of the Address RAM 50 is passed to the Memory Request Logic (80).

A hit on the same location of both the Page Table ASD CAM (30) and the Page Index CAM (40) indicates that the ASD number of the page corresponding to the page index and page table ASD number is present in the ASD RAM 60 at the location given by the location of the hit. The location number of the CAM hits is presented to the ASD RAM 60 which in turn supplies the ASD number of the destination page. The output of the ASD RAM 60 is passed to the Memory Request Logic 80.

The Memory Request Logic 80 uses the inputs from the RAMs 50 and 60, along with its other inputs to generate four alternate potential addresses. (1) It multiplies the page table ASD number by 4 to give the address of the ASD1 word of the page table. (2) It adds the base address from the Address RAM 50 to the page index to form the address of a location in a page table. (3) It multiplies the page ASD number supplied by the ASD RAM 60 by 4 to form the address of its ASD1 word. (4) It also adds the base address from the Address RAM 50 to the word index to form the address of a target word within a page. Which of these are valid addresses and which are used is determined by the Control Logic 100 based on the hits found in the CAMs. The same 'fetch data' memory command on line 89c is issued with all the addresses.

If hits are found in the same location of the Segment CAMs 10 and 20, then all the information needed to complete the Load is present in the ASDAM and the Control Logic selects the address of the target data formed by adding the base of the destination page supplied by the Address RAM 50 to the word index from line 48, FIG. 1. It then issues a memory command with that address to main memory 90 and the data, when it returns, is sent to the waiting processor. This completes the Load operation.

If the Control Logic 100 detects a miss in the Segment CAMs 10 and 20 and a hit in the Page CAMs 30 and 40, then it selects the ASD1 address translated from the Page ASD number supplied by the ASD RAM 60 and issues a memory command to read this word from main memory 90. This word contains the base address of the page corresponding to the page table ASD number and page index supplied by the processor, i.e., the base address required to complete the Load. Thus, assuming a hit in the Page CAMS, the ASDAM is simultaneously searching the Segment CAMs (10, 20) for data while generating the address in memory of that same data.

If the Control Logic 100 detects neither of the above pairs of hits, it checks for a hit in the Segment ASD CAM 20 alone. If there is a hit here, the address of the base of the page table is present in the Address RAM 50. From the structure of page tables, it is known that the ASD number of each page of the virtual segment resides at an offset from the base equal to its page index. By adding the page index supplied by the processor onto the base of the page table, the Memory Request Logic 80 forms the address of the location in memory which contains the ASD number of the destination page. This is the address selected by the Control Logic 100 and issued to main memory with a fetch request. Again, assuming a hit in the Segment ASD CAM 20, the ASDAM is simultaneously searching the Page CAMs for data while generating the address in memory of that same data.

If the Control Logic 100 detects neither of the above pairs of hits, nor a hit in the Segment ASD CAM 20, the address of the page table's ASD1 word, translated from the ASD number provided by the processor, is sent to memory 90 with a read request. Once again, while searching a CAM, the ASDAM is preparing for a miss by forming the address in memory of the data it is searching for.

When the Control Logic 100 detects that a required data item is missing, it must halt the execution of instructions in the processor while the data is fetched and the CAMs and RAMs are updated. The processor has a mechanism used for interrupting the execution of an operator and invoking a specific microcode routine, after which the original operator is re-started. The mechanism is initiated by certain hardware-detected conditions and the microcode routine invoked is dependent on the particular situation. The ASDAM uses this mechanism to interrupt the flow of microcode and fill the ASDAM with the required data and then re-start execution at the place where the missing data was detected. This is achieved by putting the current microinstruction address on the processor subroutine stack located within processor 4, and setting a new microinstruction address into the processor sequencing control. The microcode continues to execute from this new location until it completes its function, when the original micro-instruction address is retrieved from the subroutine stack and execution continues from that point.

Three short microcode routines may be invoked by the ASDAM Control Logic 100: (a) The "Page Table Fill" routine is used to fill and validate the Segment ASD CAM 20 and Address RAM 50; (b) The "Page ASD Fill" routine to fill and validate the Page Table ASD CAM 30, the Page Index CAM 40 and the ASD RAM 60; (c) The "Page Base Fill" routine fills and validates both the Segment ASD CAM 20 and the Segment PI CAM 10 as well as the Address RAM 50. Each routine requires two machine cycles plus a single memory read.

If the Load flag is set on line 41f and a hit is not found in the Segment CAMs 10 and 20 but there is a hit in the same location of both Page CAMs 30 and 40, then the Control Logic 100 initiates a memory read using the address of the destination page ASD1 word and invokes the Page Base Fill routine. When the fill is complete, the operator is restarted and the required hit is found. The address is formed and the request issued in the same machine cycle.

If the Load flag is set and a hit is not found in the Page CAMs 30 and 40 or both the Segment CAMs 10 and 20 but there is a hit in the Segment ASD CAM 20, then the Control Logic 100 initiates a memory read using the address of the destination page ASD number and invokes the Page ASD Fill routine. When the fill is complete, the operator is restarted. Inevitably this time there is a hit in the Page CAMs and no joint hit in the Segment CAMs. Now a memory request for the destination page base address is initiated and the Page Base Fill routine is invoked. When the fill is complete, the operator is restarted. Inevitably this time there is a joint hit in the Segment CAMs and the Load is completed.

Figure 7:
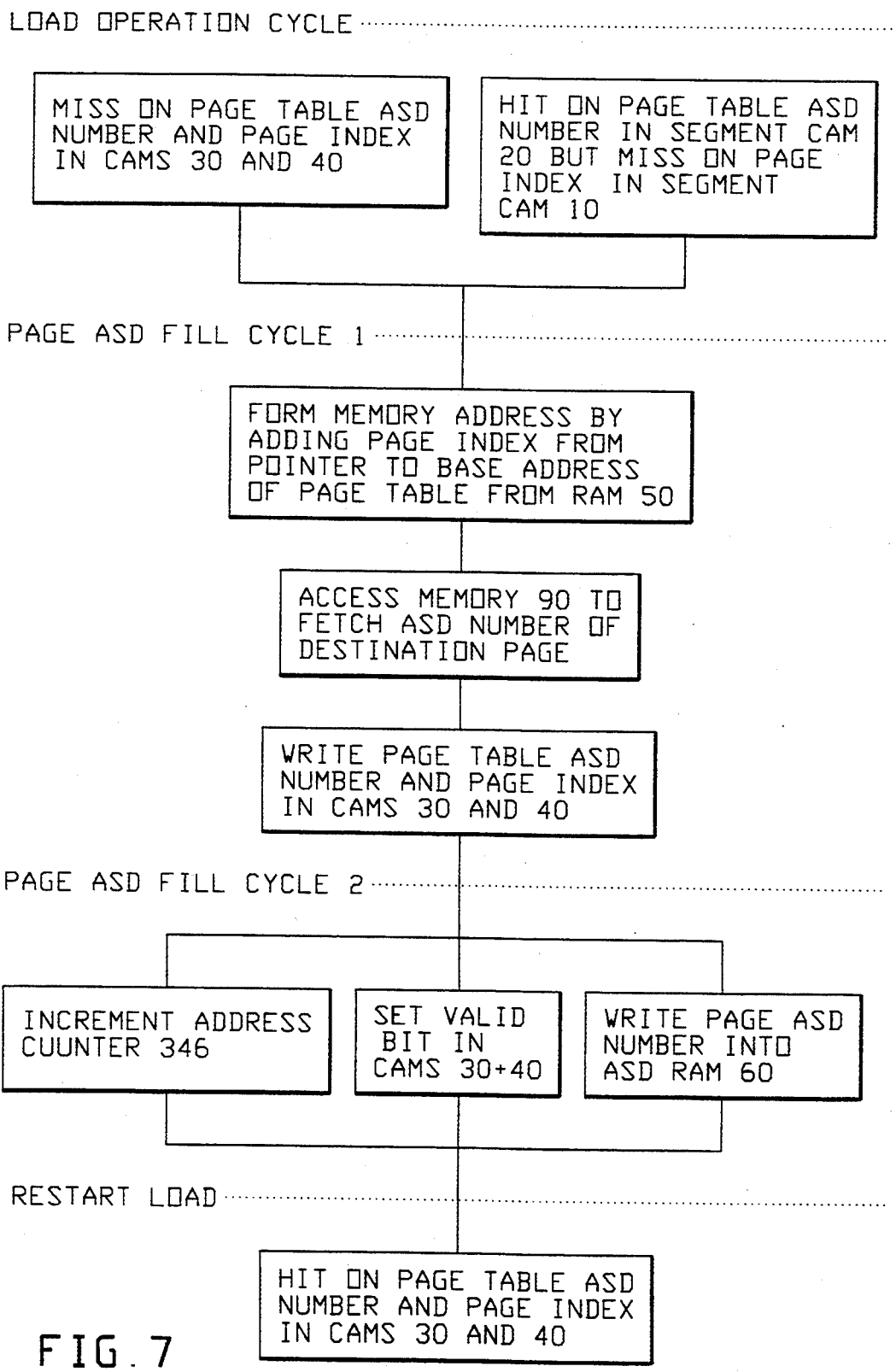
FIG. 7 is a flow chart illustrating the Page ASD Fill Routine Sequence.
Figure 8:
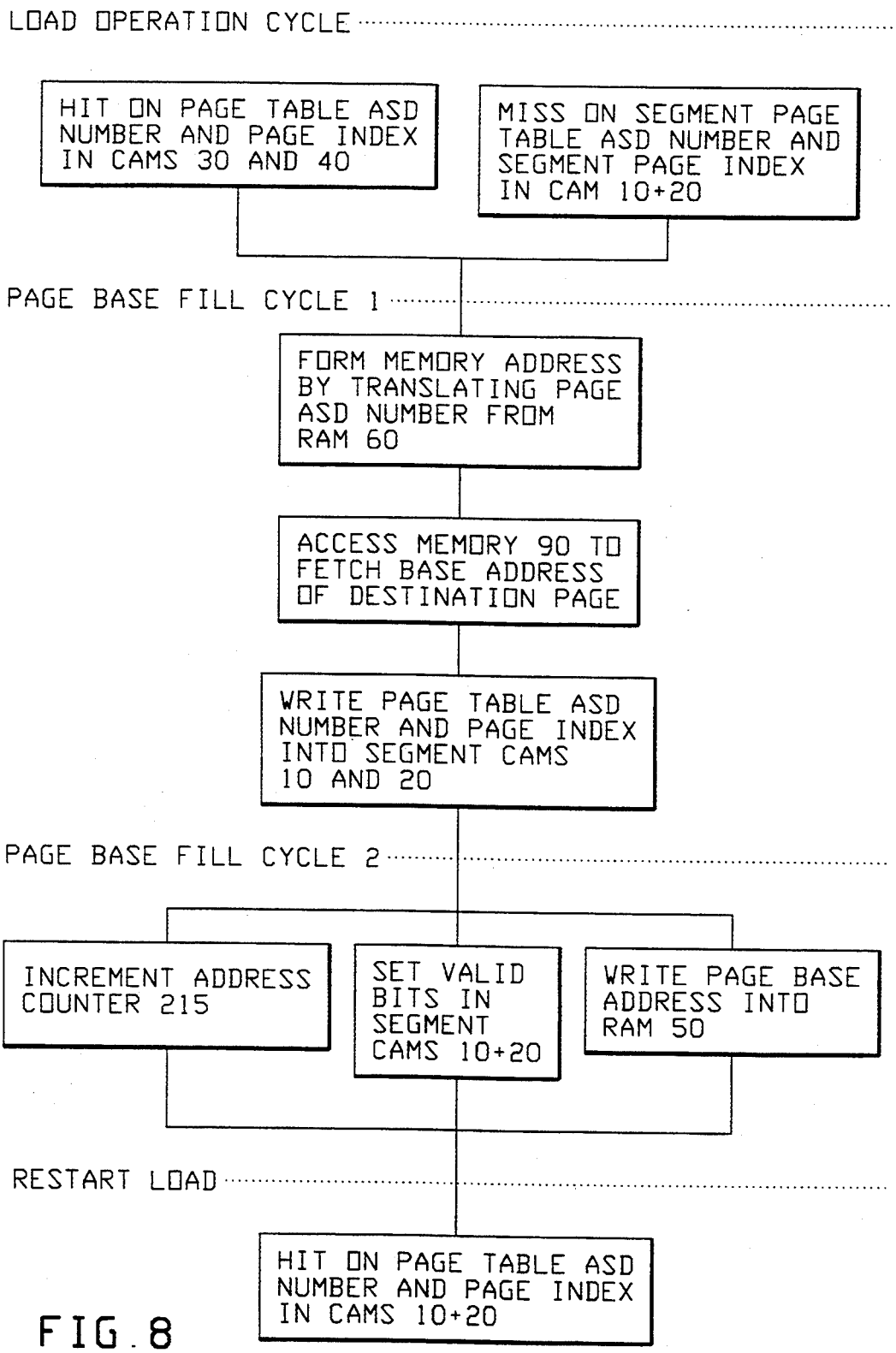
FIG. 8 is a flow chart showing the Page Base Fill Routine Sequence.

If a hit is not found in the Segment CAMs (10, 20), Page CAMs or in the Segment ASD CAM (20) alone, then the Control Logic 100 initiates a memory read using the address of the ASD1 word translated from the page table ASD number supplied by the processor. The Page Table Fill routine (FIG. 6) is then invoked. When the Page Table Fill routine is complete, the operator is restarted. This time there is a hit in the Segment ASD CAM 20 and no hit in the Page CAMs (30, 40). Now a memory request for the destination page ASD number is initiated and the Page ASD Fill routine (FIG. 7) is invoked. When the fill is complete, the operator is restarted. This time there is a hit in the Page CAMs 30, 40 and no joint hit in the Segment CAMs 10, 20. Now a memory request for the destination page base address is initiated and the Page Base Fill routine (FIG. 8) is invoked. When the fill is complete, the operator is restarted. This time there is a joint hit in the Segment CAMs 10, 20 and the Load is completed.

Calling the routines in serial is slightly less efficient than invoking a routine which performs all the necessary fills but the cases requiring it are rare and dealing with it in this way is consistent and allows simplification of hardware, microcode and Control Logic.

(a) The Page Table Fill routine (FIG. 6): writes the missing page table ASD number into a location in the Segment ASD CAM 20 given by the current value of the 16-location address counter 215 in the Control Logic. The processor then waits until the memory returns the requested base address data which is written into the Address RAM 50, at the location given by the unchanged 16-location address counter. At the same time, the valid bit for this location in the CAM is set and the 16-location address counter is incremented, so that next time a fill is done, the next contiguous location is written. The fill is now complete and next time a search is performed on this same ASD number, a hit will be returned.

(b) The Page ASD Fill routine (FIG. 7): writes the missing page table ASD number and page index into a location in the Page Table ASD CAM 30 and Page Index CAM 40 given by the current value of the 8-location address counter 346 in the Control Logic 100. The processor 4 then waits until the memory 90 returns the requested page table ASD number which is written into the ASD RAM 60, at the location given by the unchanged 8-location address counter. At the same time, the valid bit for these CAM locations is set and the 8-location address counter is incremented, so next time a fill is done, the next contiguous location is written. The fill is now complete and the next time a search is performed on this same page table ASD number and page index, hits will be returned from CAMs 30, 40.

(c) The Page Base Fill routine (FIG. 8): writes the missing page table ASD number and page index into a location in the Segment ASD CAM 20 and Segment PI CAM 10 given by the current value of the 16-location address counter 215 in the Control Logic 100. The processor then waits until the memory returns the requested page base address data which is written into the Address RAM 50, at the location given by the unchanged 16-location address counter. At the same time, the valid bits for these CAM locations are set and the 16-location location address counter is incremented, so next time a fill is done, the adjacent location is written. The fill is now complete and next time a search is performed on this same ASD number and page index, hits will be returned from CAMs 20 and 10.

The data written into the ASDAM memories during the course of a Load operation may be used in subsequent Loads of data in the same page or different pages of the same segment. Locations remain valid until the location counters 215 and 346 (FIG. 1) wrap around and overwrite them in turn with new data. No data is ever written into the ASDAM unless it has been searched for immediately prior. This guarantees that the same data is never found in two different locations.

There are certain times during processor operation when the ASD table 90T in memory 90 is modified by the Operating System. As with any cache, it must be guaranteed that the data in the cache accurately reflects the actual data stored in memory 90. Coherency must be maintained and since the ASD table is changed very infrequently, this is achieved by simply purging the ASDAM 8, whenever it takes place. The Control Logic 100 receives a flag from the processor indicating that a change is being made to the ASD table 90T. The Control Logic then resets all the CAM valid bits to zero simultaneously. The next searches for any given ASD number or page index will therefore always result in misses and the correct data will be fetched from the updated ASD table 90T.

Three operational examples are discussed hereinbelow to illustrate the functional efficiencies of the ASDAM system.

EXAMPLE 1 SITUATION: (FIG's 9, 10)

Load from a paged segment without the ASDAM

Figure 9:
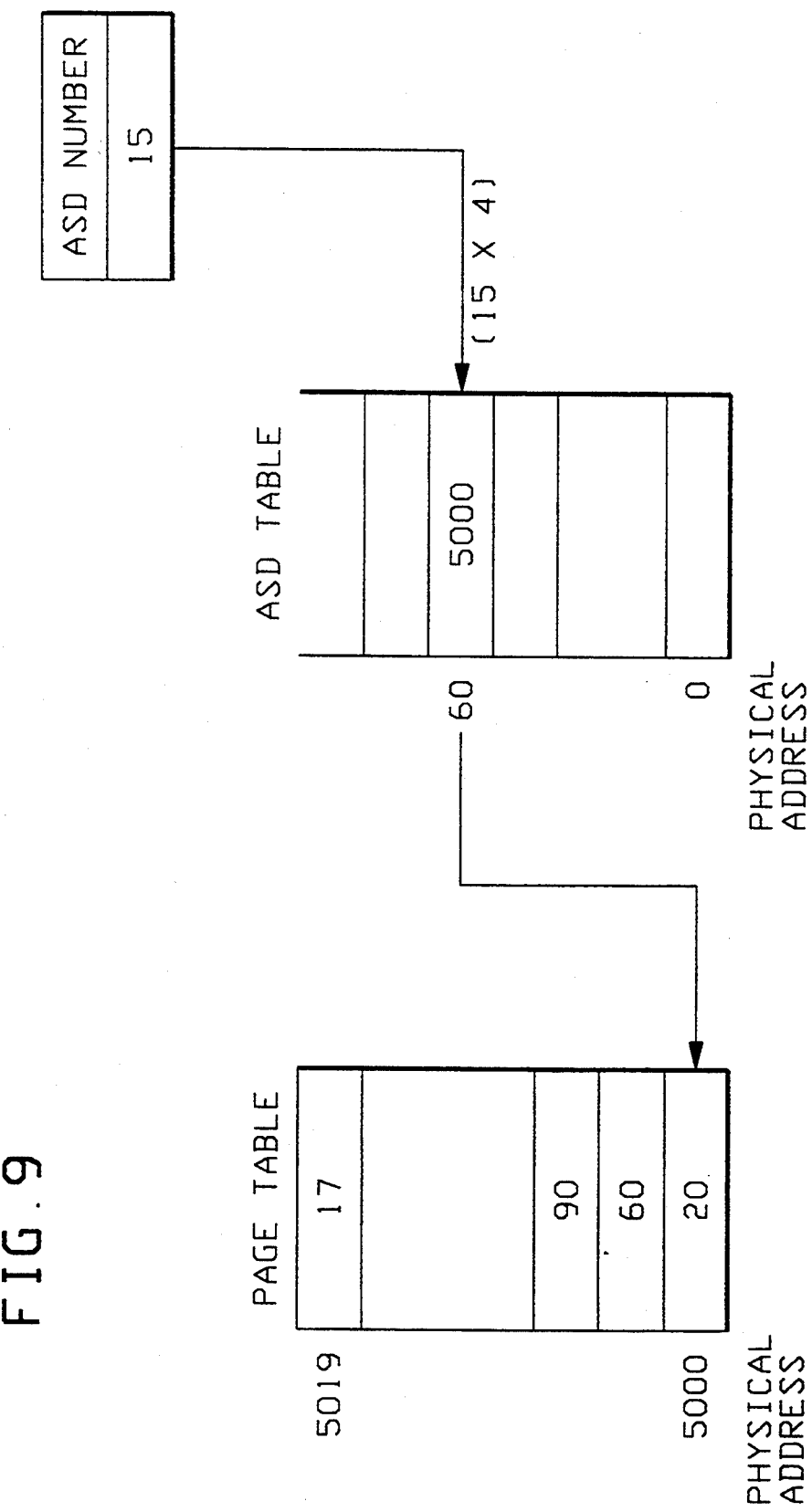
FIG. 9 shows an ASD number referencing a page table which identifies a region of paged memory.

Consider a Load from ASD number 15, page index 2 and word index 5. The target data would therefore be the 5th word in the 2nd page of the virtual segment whose page table had ASD number 15. The Page Table defining this segment is shown in FIG. 9. The page table ASD number (15) is multiplied by 4 to translate it into the physical address (60) of the location of the ASD table containing the base address (5000) of the page table for that segment. A read request is issued to memory 90 to fetch the data at this location.

When the base address of the page table (5,000) returns, the processor adds the page index, 2, onto it. This forms the address (5002) of the location in the page table which contains the ASD number (90) of page 2 of the segment. This address is sent to the memory with a request to return the data present at that location.

Figure 10:
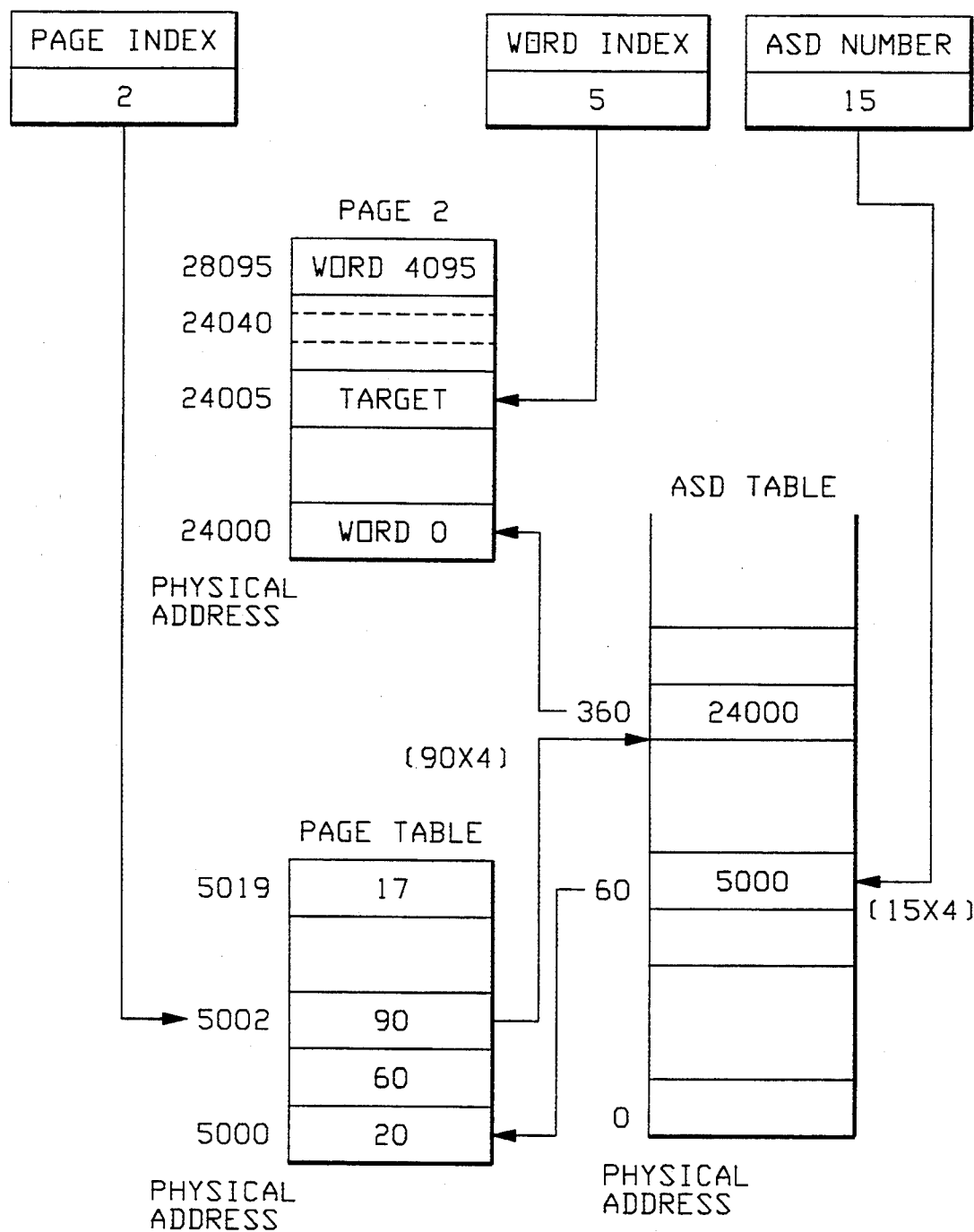
FIG. 10 shows an ASD number, page index and word index referencing a target word in main memory.

When this ASD number (90) returns, it is multiplied by 4 to translate it to the address (360 shown in FIG. 10) of the location in main memory containing the base address of page 2 of the segment. This is shown in FIG. 10. The address is then sent to memory with a request to return its contents.

When the base address of page 2 (24,000) is returned, the processor adds to it the word index of 5 to form the address (24,005) of the target data word. This address may now be sent to memory to finally return the target data. Four serial memory fetches have been required.

EXAMPLE 2 SITUATION: (FIG. 11)

Load from a page segment with the ASDAM

Consider the same Load operation described in example 1, (FIG. 10) but this time using the ASDAM system. Originally the ASDAM CAMs and RAMs are empty and both the address counters 215, 346 have values of zero. The processor presents the page table ASD number (15), the page index (2) and the word index (5) to the ASDAM as was done in FIG. 10. The ASDAM searches the Segment PI CAM 10 and the Page Index CAM 40 with the page index and searches the Segment ASD CAM 20 and the Page Table ASD CAM 30 with the ASD number. No hits are found in any CAM. In the meantime, the Memory Request Logic 80 has translated the ASD number into the address (60 in FIG. 10) of the ASD1 word of the page table. The Control Logic detects no hits in the CAMs and selects this address to be sent to the memory with a memory read request.

Figure 6:
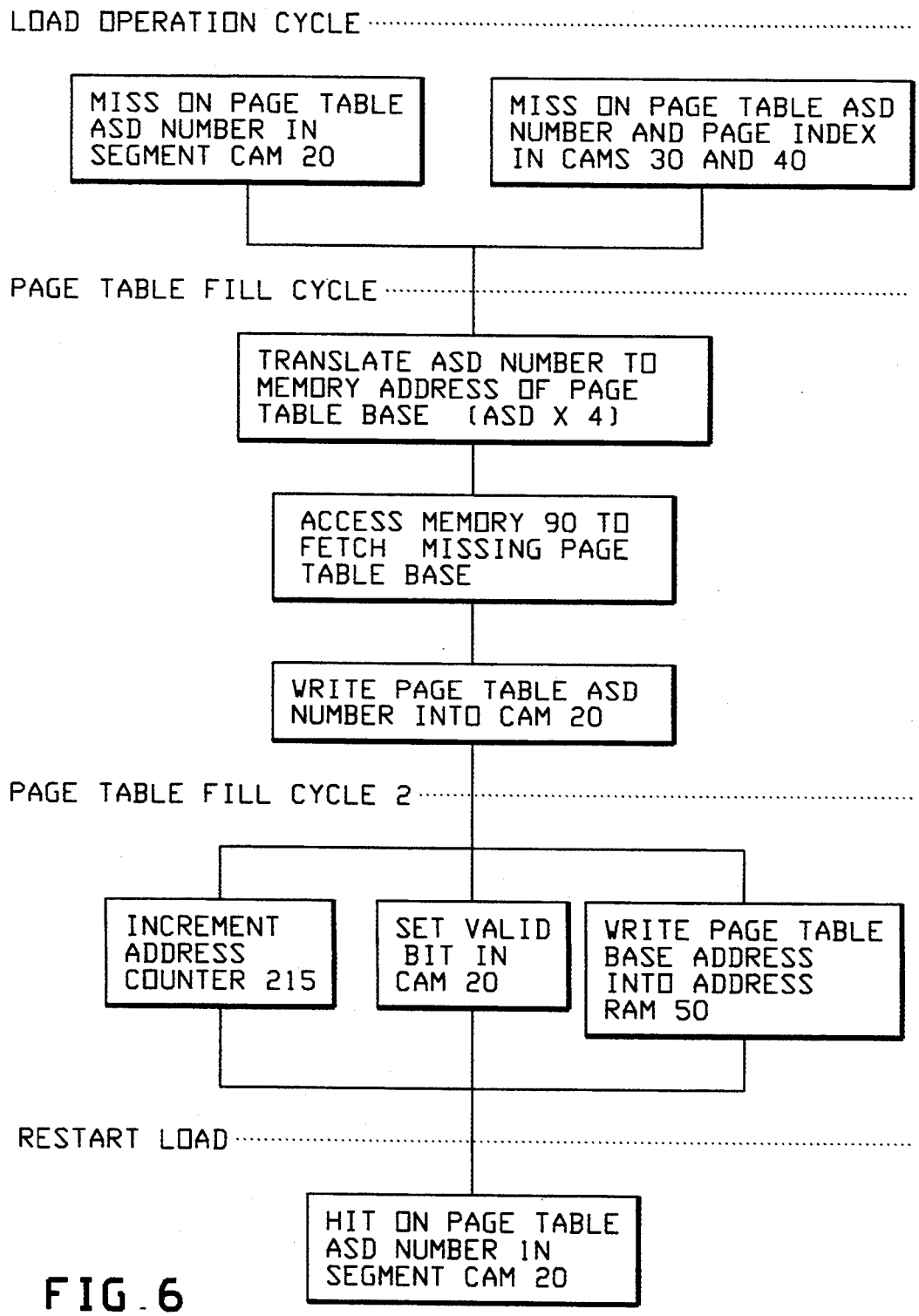
FIG. 6 is a flow chart illustrating the sequence for the Page Table Fill Routine.
Figure 11:
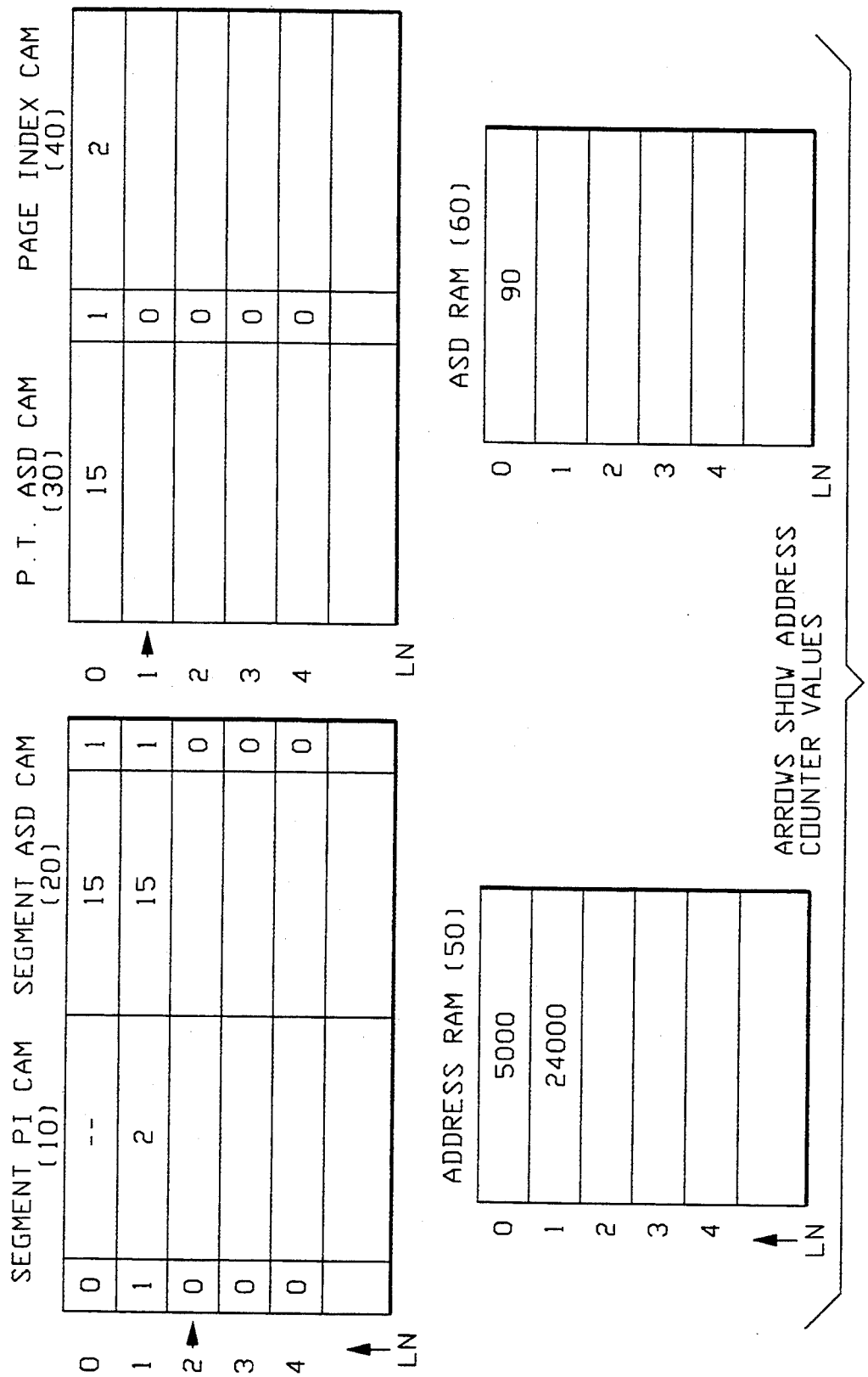
FIG. 11 shows the contents of the ASDAM memories if no hits are found at the same location number of the Segment PI CAM 10 and the Segment ASD CAM 20, for illustrating the described Example 2 situation.

At the same time as the request is sent, the control logic 100 interrupts execution in the processor and initiates the Page table Fill routine FIG. 6. The ASD number is stored in the next available location (0) of the Segment ASD CAM 20 in FIG. 11, given by the 16-location address counter. When the memory subsequently returns the base address (5000), this is stored at location 0 of the Address RAM, as shown in FIG. 11. The valid bit of this location is set and the 16-location address counter is incremented and now has value 1. The Load is then restarted and this time when the search is performed, a hit is found at location 0 of the Segment ASD CAM 20. No other hits are found. The location number(LN) 0 is passed down to the Address RAM 50 to be used as a read address. The base address (5000, FIG. 10) of the page table is supplied at the output of the Address RAM.

The Control Logic 100 selects the output of the Memory Request Logic 80 to be the sum of the base address of the page table (5000) and the page index (2). This address (5002) contains the ASD number of page 2 of the virtual segment. The address is sent to the memory with a command to return the data. At the same time, the Page ASD Fill routine (FIG. 7) is initiated. This writes the ASD number and the page index into the next available location (0) of the Page Table ASD CAM 30 and the Page Index CAM 40 respectively. This location is supplied by the 8-location address counter. When the ASD number (90), FIG. 10, comes back from memory, it is written into location 0 of the ASD RAM 60 FIG. 11. The valid bit of location 0 of both these CAMs is set and the 8-location address counter is incremented and now has value 1. This is shown in FIG. 11. The Load is then restarted and this time when the search is performed, a hit is found at location 0 of both the Page Table ASD CAM 30 and the Page Index CAM 40. The ASD number of page 2 (90) is available at the output of the ASD RAM 60. The Control Logic 100 selects the output of the Memory Request Logic 80 to be the translated page ASD number, giving the address of the location (360 FIG. 10) in the ASD table containing the base address of page 2. The address is sent to the memory 90 with a command to return the data. At the same time, the Page Base Fill routine (FIG. 8) is initiated. This writes the page table ASD number (15) and the page index (2) into the next available location (1) of the Segment ASD CAM 20 and the Segment PI CAM 10 respectively. When the base address (24,000) comes back from memory it is written into location 1 of the Address RAM 50. These locations are then validated and the 16-location address counter is incremented. The Load is then restarted and this time when the search is performed, a hit is found at location 1 of both the Segment ASD CAM 20 and the Segment PI CAM 10. The base address of page 2 (24,000) is available at the output of the Address RAM 50.

The Memory Request Logic 80 adds the page's base address to the word index to form the address (24,005), FIG. 10, of the target data in memory. This address is selected by the Control Logic and sent to the memory with a read request. The data is returned by the memory to the processor. The final ASDAM contents are shown in FIG. 11.

EXAMPLE 3 SITUATION

Second Load from the same segment with the ASDAM

Consider now using the ASDAM system to Load the data from, for example, word index 40 of page 2 of the segment with ASD number 15. The page table ASD number and page index are used to search the CAMs as before. This time there is a hit in the all CAMs. The location number (LN=1) of the hits in both the Segment ASD CAM 20 and the Segment PI CAM 10 is selected by the Control Logic 100 to be the read address of the Address RAM 50. This yields the base address of page 2 (24,000, FIG.10) which is added (by the Memory Request Logic 80) to the word index (40) to give the address (24,040) of the new target word. This address is selected by the Control Logic 100 and sent to the memory 90 having a read request. The target data is returned by the memory to the processor 4.

The read request of the target is generated in a single machine cycle, without any intermediate memory accesses. In this way, any target word may be requested from this page in a single machine cycle, bypassing the 3 intermediate memory requests. A target data word residing in a different page of the same segment could be requested the first time with 2 rather than 3 intermediate memory requests, and without any intermediate memory requests thereafter.

In summary, the Actual Segment Descriptor Associative Memory (ASDAM) system enhances processor performance by reducing the number of machine cycles and intermediate memory accesses required to access a target data word from a paged region of memory. The system operates by providing special purpose hardware functions and an arrangement of custom CAM and RAM structures to supply information about the page segment that would otherwise have to be fetched from memory. The ASDAM Control Logic monitors and directs all data fetch operations required by the executing code and can interrupt processor execution to perform its own operations to fetch segment information from memory and store it internally. When the ASDAM contains the required information, an address translation and memory request can be performed in a single machine cycle. The ASDAM also works concurrently to ensure that if the required information is missing, that the operation is continued with the minimum delay.

The ASDAM system achieves a significant performance advantage over previous address translation cache systems which do not allow for the multiple steps required to access paged memory. In addition, the system greatly reduces the amount of microcode traditionally used to accomplish this operation and significantly reduces the amount of memory traffic.

While the preferred embodiment has been herein described, other embodiments may use the same principle involved in the invention which is defined in the following claims.

What is claimed is:

1. A system enabling a processor means to establish a target data word in a target page whereby the system uses target logical address data designated as Actual Segment Descriptor Numbers, and word index displacement data for targeting a desired target data word in a paged main memory means, to enable address translation from said target logical address data to physical main memory address data in one clock cycle, providing said processor means (4) with rapid target data word access in said paged main memory means and wherein said paged main memory means uses (i) a plurality of memory segments where the first word at the first page of each segment is identified by a logical address Actual Segment Descriptor (ASD) Number and each segment has a plurality of pages where each page holds the same number of data words and the first word of each page of each segment is identified by said Actual Segment Descriptor (ASD) Number for the first word of each page in a segment and said paged main memory means further includes (ii) an Actual Segment Descriptor (ASD) Table which lists the physical address of the first word of each memory segment and the ASD Number of an associated Page Table means which provides a plurality of Page Tables wherein each Page Table provides an identifying Actual Segment Descriptor (ASD) Number for the said first word of each page in each segment in said paged main memory means, said system comprising:

(a) cache CAM means (10, 20, 30, 40) for holding the logical address data consisting of Actual Segment Descriptor (ASD) numbers and Page Index (PI) numbers for targeting said target page in said paged main memory means;

(b) means within said processor means (4) for providing said target logical address data and said word index displacement data and searching said cache CAM (10, 20, 30, 40) means for a match of said target logical address data;

(c) means for initiating a process for replenishing said target logical address data, using said processor means (4), when said target logical address data is not resident in said cache CAM (10, 20, 30, 40) for later subsequent access by said processor means (4);

(d) means, when said processor means (4) search indicates a hit in said cache CAM means (10, 20, 30, 40), to point to a location in a first RAM means (50) containing the physical memory address of the first word of said targeted page in said paged main memory means, said physical memory address being transmitted to a memory request logic means (80);

(e) said memory request logic means (80) for generating a physical memory address of said target data word in said paged main memory means, said memory request logic means (80) being provided with a physical address of the first word of the said target page in said paged main memory means and said word index displacement data of said target data word in said paged main memory means as provided by said processor means (4);

(f) said first RAM means (50) for holding the physical address of the first word of said target page in said paged main memory means;

(g) second RAM means (60) for holding the Actual Segment Descriptor (ASD) Numbers, designated as Page Actual Segment Descriptor Numbers, of pages holding frequently used words which may be targeted as a said target data word, in said paged main memory means, to eliminate the need for accessing said paged main memory means, in retrieving the said target logical address data of said target page.

2. A logical address associative memory system, working in conjunction with a processor which provides base logical address at the first word location in a targeted page and a word displacement index to pinpoint a targeted word within said targeted page, and main memory which is organized into segments where each segment, is divided into pages each holding the same number of data words, for providing optimum access to memory data words, said system comprising:

(a) first cache CAM means (10, 20) for storing said base logical address of the segment holding the said target page in said main memory which holds said targeted word said base logical address consisting of an Actual Segment Descriptor Number (ASD No.) and a Page Index Number (PI);

(b) processor means (4) generating a target logical address consisting of said Actual Segment Descriptor (ASD No.) and said Page Index Number, to specify said targeted page holding said targeted word for searching said first cache CAM means for a match in said base logical addresses residing in said first cache CAM means;

(c) RAM means (50) to transmit the base physical address of said targeted page to a Memory Request Logic Means (80) when said match occurs in said first cache CAM means;

(d) said Memory Request Logic means (80) for providing a physical address composed from said base physical address and said word displacement index provided by said processor (4), thus enabling access, to said main memory, of said targeted word;

(e) wherein each of said segments of said main memory (90) has a given base logical address, designated as a segment Actual Segment Descriptor Number (ASD No.) that points to a corresponding Page Table containing a plurality of Page Actual Segment Descriptor Numbers (Page ASD Nos.) which specify the given base logical address of each page in said segment, said main memory storing:

(e1) an ASD Table which identifies base physical addresses of first word locations of said Page Tables and the first locations of the plurality of segments in said main memory;

(e2) a Page Table for each said segment ASD Number, the contents of which identifies each page in said segment with a given Page ASD Number which locates a specific Page Actual Segment Descriptor Number (Page ASD No.) relative to its given base logical address in said Page Table.

3. The system of claim 2 which includes:

(a) second cache CAM means for (30, 40) search operations when said first cache CAM means (10, 20) does not contain said segment base logical address and segment Page Index Number required by the processor's search, said second cache CAM means including:

(a1) means for storing logical address data for memory segments frequently accessed;

(a2) means for storing said segment Page Index Numbers for pages in said frequently accessed segments;

(b) RAM address (60) means for supplying, when a miss occurs in said first cache CAM means (10, 20,) and a match occurs in said second cache CAM means (30, 40), for a targeted segment, a logical address corresponding to the base logical address of said targeted page;

(c) control logic means (80) for initiating operations to replenish missing base logical addresses and Page Index numbers of said frequently accessed memory segments.

4. The system of claim 3 wherein said control logic means includes:

(a) means to replenish the base logical addresses of said frequently accessed segments and said Page Index Number for storage in said first cache CAM (10, 20) means and said second cache (30, 40) CAM means, when said first and second cache CAM means fail to provide a match for said base logical addresses and Page Index Numbers being searched.

5. A logical address associative memory system working in conjunction with a processor and main memory means which is organized into segments, where each segment is organized into pages, for providing optimum access to a targeted data word in said main memory means wherein, (a) said main memory means holding data words which can be targeted for access by said processor, (a1) wherein each of said segments of said main memory means is identified logically by an ASD (Actual Segment Descriptor) Number in an ASD Table and wherein each of the pages of each segment holds the same number of words;

(a2) said main memory means storing a plurality of ASD Page Tables, each of said ASD Page Tables having a page index number for each page in a given segment and associating each page index number with a physical memory address;

(a3) each said ASD Table providing an identifying ASD Number for each segment of said main said system comprising memory means;

(b) means within said processor means for establishing said ASD Page Tables and said ASD tables in said main memory means and for asserting a search in a first cache CAM means (10, 20) for a targeted data word in a targeted page, and including:

(b1) means to generate a pointer specifying said page index number, a word index and an ASD Number which identifies the segment holding said targeted data word, said word index providing an index displacement value of a targeted data word residing "X" locations beyond a base address of the targeted page identified by its ASD number and its Page Table ASD Number;

(b2) means to search said first cache CAM means (10, 20) for said targeted data word identified by said page ASD number and a page index number;

(c) said first cache CAM means (10, 20) for storing the ASD Number holding Page Table ASD No. of the page in memory which holds a targeted data word and for storing said page index number from said Page Table ASD No., of the location of the said targeted data word;

(d) RAM means (50) to transmit a base physical address of the page containing the targeted data word to a memory request logic means (80) when a match occurs in said first cache CAM means;

(e) said Memory Request Logic means for providing the physical address to said main memory means to access said targeted data word for use of said processor means.

6. The system of claim 5 which includes:

(f) means for locating and supplying, to said first cache CAM means, any missing ASD Numbers and page index number undergoing search in said first cache CAM means.

7. A system for utilizing a set of logical memory location information provided by a processor means (4) representing the physical location of a target data word in a target page located in a paged main memory means having segments each holding a plurality of pages, whereby target logical address data and word index displacement data, for locating a target data word in a paged main memory means, is translated to physical address of said target data word location in one clock cycle, providing said processor means (4) with rapid target data word access in said paged main memory means, said system comprising:

(a) first cache CAM means (10, 20) for holding a beginning-base logical address for each of segments having frequently used pages residing in said paged main memory means and holding Page Index Numbers to point to specific pages in an addressed segment, and including:

(a1) means to generate a first location number when search means searches and finds a match;

(b) second cache CAM means (30, 40) for holding a beginning logical address for each of frequently used pages and said Page Index numbers to pinpoint specific pages in a segment; and including:

(b1) means to generate a second Location Number when a match occurs during a search of said second cache CAM means;

(c) means within said processor means (4) to initiate searches of said first cache CAM means to see if a match occurs with a processor-generated target logical address and Page Index number and to generate said first Location Number, when a match occurs, which points to a location in a first RAM means (50);

(d) said first RAM means (50) holding a set of frequently used beginning-base physical addresses of segments in said paged memory means and including:

(d1) means to receive said first Location Number to access a first physical address which points to a corresponding one of said beginning-base physical addresses of the segment holding the target page;

(d2) means to convey said first base physical address to a memory request logic means (80);

(e) said memory request logic means (80) for generating a cumulative physical memory address of said target data word in said paged main memory means, said memory request logic means (80) having received said one beginning-base physical address of the beginning of the segment holding the said target page, and said word index displacement data of said target data word in said target page as provided by said processor means (4);

(f) control logic (100) means for initiating a process to replenish said target logical address data and Page Index number into said first cache CAM means, (10, 20) when said target logical address data and Page Index Number is not resident in said first cache CAM means (10, 20) for later subsequent access by said processor means (4), said control logic means including:

(f1) means to search said second cache CAM means (30, 40) to seek the logical address of said target page and said Page Index Number for placement into said first cache CAM means (10, 20);

(g) second RAM means (60) for receiving a second Location Number to access the logical address of the said target page for transmittal to said memory request logic means (80);

(h) wherein each of said plurality of pages of each of said segments of said main memory has the same number of storage locations for data words and wherein each segment has its said beginning-base logical address defined by an Actual Segment Descriptor Number (ASD No.) pointing to a Page Table, and each page in each segment has its beginning-base logical address designated as a Page Table ASD Number contained in said Page Table, said main memory including:

(h1) an ASD Table which identifies each memory segment with a segment ASD Number;

(h2) said Page Table for each said segment ASD Number which identifies each page in the segment with a Page Table ASD Number and Page Index number of the target page for locating said target page relative to the beginning-base logical address of the segment holding said target page.

* * * * *